United States Patent
Shen et al.

(10) Patent No.: US 9,699,603 B2
(45) Date of Patent: Jul. 4, 2017

(54) UTILIZING MOBILE WIRELESS DEVICES TO ANALYZE MOVEMENT OF CROWDS

(71) Applicant: Cisco Technology, Inc., San Jose, CA (US)

(72) Inventors: Zhitao Shen, Shanghai (CN); David Tang, Shanghai (CN); Hao Liu, Shanghai (CN); Yu Zhang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/882,670

(22) Filed: Oct. 14, 2015

(65) Prior Publication Data

US 2017/0111760 A1    Apr. 20, 2017

(51) Int. Cl.
*H04W 4/02* (2009.01)
*H04W 24/02* (2009.01)
*H04W 84/12* (2009.01)

(52) U.S. Cl.
CPC .......... *H04W 4/02* (2013.01); *H04W 24/02* (2013.01); *H04W 84/12* (2013.01)

(58) Field of Classification Search
CPC ........ H04W 4/02; H04W 24/02; H04W 84/12
See application file for complete search history.

(56) References Cited

U.S. PATENT DOCUMENTS

| 7,042,391 | B2 | 5/2006 | Meunier et al. |
| 7,054,627 | B1 | 5/2006 | Hillman |
| 7,957,565 | B1 | 6/2011 | Sharma et al. |
| 8,208,943 | B2 | 6/2012 | Petersen et al. |
| 8,694,443 | B2 | 4/2014 | Bobbitt et al. |
| 2010/0197318 | A1* | 8/2010 | Petersen ............... G06Q 10/10 455/456.1 |
| 2011/0022443 | A1 | 1/2011 | Partridge et al. |

OTHER PUBLICATIONS

Dr. James Little, et al., "A Technical Review of Cisco's Wi-Fi-Based Location Analytics", White Paper, Jul. 2013, 9 pages.
(Continued)

*Primary Examiner* — Chuong A Ngo
(74) *Attorney, Agent, or Firm* — Edell, Shapiro & Finnan, LLC (57) ABSTRACT

According to the techniques presented herein, location data from signals transmitted by a plurality of mobile wireless devices in a wireless network are obtained. For each mobile wireless device, location data time points are aggregated to generate a plurality of routines or paths of movement for each mobile wireless device within a predefined space. The predefined space is partitioned into a plurality of units and each routine of the plurality of routines is also partitioned into a plurality of subroutines or segments. For each unit, one or more subroutines within a predefined distance of a frequent subroutine are combined with the frequent subroutine, and the frequent subroutines may be displayed on a graphical interface to visualize aggregate movement of the plurality of mobile wireless devices within the predefined space. Frequent subroutines may be analyzed in an automated manner to generate notifications and alerts.

20 Claims, 11 Drawing Sheets

(56) References Cited

OTHER PUBLICATIONS

Galati, et al., "Opportunistic Forwarding Throughout Customers or Sellers in Shopping Mall Environments", 978-1-4673-4404-3, IEEE, 2012 IFIP Wireless Days, Nov. 21-23, 2012, 3 pages.
Lee et al., "Trajectory Clustering: A Partition-and-Group Framework", SIGMOD '07, Jun. 11-14, 2007, Beijing, China, 12 pages.
Li et al., "Traffic Density-Based Discovery of Hot Routes in Road Networks", Advances in Spatial and Temporal Databases, vol. 4605 of the series Lecture Notes in Computer Science, pp. 441-459, 19 pages.

* cited by examiner

UTILIZING MOBILE WIRELESS DEVICES TO ANALYZE MOVEMENT OF CROWDS

TECHNICAL FIELD

The present disclosure relates to utilizing mobile wireless devices to analyze movement, and in particular, to determining patterns of movement for crowds based upon received data from electronic mobile wireless devices configured to generate information regarding locations of individual mobile wireless device users of the crowd.

BACKGROUND

Public venues, such as shopping malls, concert arenas, businesses, etc., frequently accommodate large groups of people. Although security personnel manually monitor these large groups of people for prolonged periods of time, this approach is impractical, inefficient and error-prone. For example, detecting emerging situations (e.g., emergencies, medical issues, security issues, etc.) is often a slow process, relying on information from bystanders.

With the popularity of Wi-Fig and other location-based analytics solutions, platforms have been developed to interface with mobile wireless devices. Such platforms provide the ability to interact with mobile wireless devices to collect and analyze data. However, current techniques associated with collecting and analyzing such data, do not efficiently monitor crowd dynamics in a complex environment, e.g., such as a large number of individuals in an open or relatively open area.

DESCRIPTION OF EXAMPLE EMBODIMENTS

Overview

According to the techniques presented herein, location data from signals transmitted by a plurality of mobile wireless devices in a wireless network are obtained, wherein the plurality of mobile wireless devices are moving within a predefined space, and wherein the location data comprises a plurality of location data time points. For each mobile wireless device, location data time points are aggregated to generate a plurality of routines, wherein each routine corresponds to a path of movement of the respective mobile wireless device within the predefined space. The predefined space is partitioned into a plurality of units and each routine of the plurality of routines into a plurality of subroutines, wherein each subroutine corresponds to a segment of the corresponding routine within a particular unit. For each unit, one or more subroutines are combined with a respective frequent subroutine, when the one or more subroutines are within a predetermined distance of the respective frequent subroutine, and wherein the respective frequent subroutine represents an aggregate of other subroutines within the unit that are within a specified distance of each other. Frequent subroutines are displayed on a graphical user interface to visualize aggregate movement of the plurality of mobile wireless devices within the predefined space.

Example Embodiments

Presented herein are techniques for utilizing mobile wireless device location data to analyze and visualize movement of crowds. Individual mobile wireless device trajectories may be collected and analyzed, and mobile device trajectories moving in a same direction may be aggregated in a quantitative manner in order to represent current trends of crowd movement. Such techniques are useful in regards to identifying abnormal or anomalous trends with respect to crowd movement. In some cases, a notification regarding the detected anomaly or abnormality is provided to a user. In other embodiments, a visual representation of aggregated crowd movement and corresponding alerts are overlaid onto a map of the physical area begin monitored, providing a manner to easily assess aggregate crowd movement.

Figure 1:
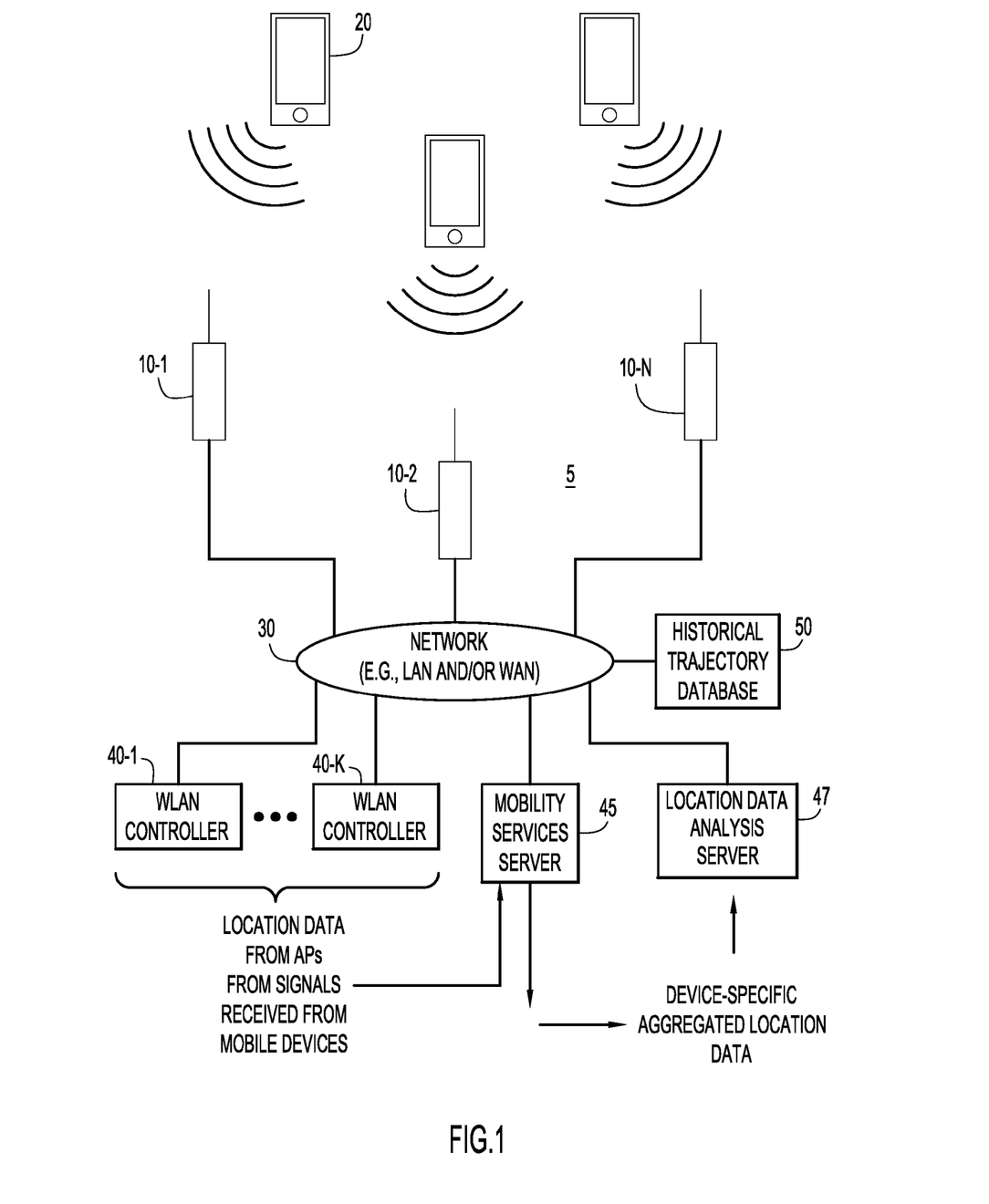
FIG. 1 is a system diagram showing wireless network infrastructure equipment configured to collect location data from mobile wireless devices, aggregate the location data for each mobile wireless device, and analyze the location data to determine crowd movement, according to an example embodiment.

Referring to FIG. 1, a wireless communication network is shown generally at reference numeral 5 comprising a plurality of wireless access points (APs) 10-1, 10-2, ..., 10-N, that are configured to wirelessly communicate with one or more client devices (also referred to herein as mobile wireless devices), one of which is shown at reference numeral 20. An individual mobile wireless device 20 is shown in FIG. 1 as an example and it is to be understood that the APs 10-1 through 10-N are capable of communicating with multiple mobile wireless devices. The mobile wireless device 20 may be a smart phone device or any other mobile device with wireless local area (WLAN) connectivity. Typically, the movement pattern of the mobile device is collected utilizing existing wireless local area network (e.g., Wi-Fi) infrastructure.

In one example, the APs 10-1 through 10-N and the mobile wireless device 20 operate in accordance with one of the IEEE 802.11 WLAN family of wireless communication protocols, known commercially as Wi-Fi®. However, the techniques described herein are not limited to any particular wireless communication protocol and may be employed in WLANs as well as other types of wireless wide area networks.

It is common in certain WLAN deployments, for users of mobile wireless devices to roam around a large physical location, e.g., a building, an office, a campus, etc., and in so doing, different APs may be needed to maintain connectivity of the mobile wireless device to the WLAN. Providing roaming support of mobile wireless devices are considered to be well-known and are not covered in detail herein.

Each of the APs 10-1 through 10-N are connected to a network (wired or wireless) 30, which typically includes local area network and wide area network connectivity. A plurality of WLAN controllers 40-1 to 40-K are also connected to the network 30. The WLAN controllers 40-1 to 40-K are used to control the various operating parameters of the APs (such as channel assignment, load, etc.). A group of APs may be assigned to a particular one of the WLAN controllers 40-1 to 40-K. The APs 10-1 to 10-N send mobility location information obtained from the mobile wireless devices as the individual users of the mobile wireless devices move about a physical area.

A mobility services server 45 is provided to collect location data (from the WLAN controllers 40-1 to 40-K) obtained by the APs 10-1 to 10-N for individual mobile wireless devices. As explained herein, the mobility services server 45 aggregates the location data from multiple APs for each mobile wireless device and generates aggregated location data for each mobile wireless device in the network (referred to herein as a routine), with the aggregated location data including location data points obtained from the movement of the corresponding mobile device user as a function of time. The mobility services server 45 forwards the aggregated data (including timestamp information, device identification, and location information) to the location data analysis server 47, and the location data analysis server 47 analyzes and aggregates the received plurality of individual wireless mobile device information to represent trends in crowd movement. Historical trajectories database 50 is provided for storing historical trajectories of mobile wireless devices, as further described herein.

While FIG. 1 shows that the mobility services server 45 and location data analysis server 47 are separate stand-alone servers, this is not meant to be limiting. For example, the functions of the location data analysis server 47 may be implemented as an application or process running on the mobility services server 45, or as an application on any application server. Thus, the functions of mobility services server 45 and the location data analysis server 47 may be integrated on the same server. In addition, while the location data is shown as being aggregated by the mobility services server 45, in other embodiments, the location data may be provided to the location data analysis server 47 for analysis of crowd movement. Moreover, the functions of the mobility services server 45 and the location data analysis server 47 may be implemented by one or more applications running in a cloud/data center environment.

Figure 2:
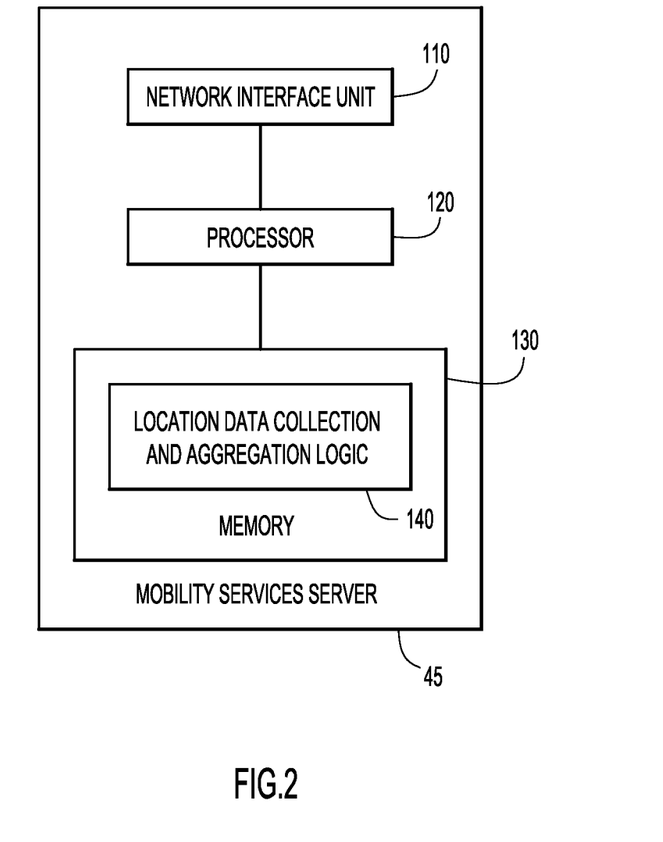
FIG. 2 is an example block diagram of a server configured to collect and aggregate location data from mobile wireless devices using wireless access points, according to an example embodiment.

Turning to FIG. 2, a block diagram showing an example of the components of the mobility services server 45 is now described. The mobility services server 45 includes a network interface unit 110, a processor 120 and a memory 130. The network interface unit 110 is, for example, an Ethernet card (or multiple instances of such devices), and enables network connectivity to communicate over network 30 with the APs 10-1 to 10-N. The processor 120 is one or more microprocessors or microcontrollers. The memory 130 may be in the form of read only memory (ROM), random access memory (RAM), magnetic disk storage media devices, optical storage media devices, flash memory devices, electrical, optical, or other physical/tangible memory storage devices. The memory 130 stores instructions for location data collection and aggregation logic 140. Location data collection and aggregation logic 140 receives information associated with the movements of individual mobile wireless devices as a function of time, and in some aspects, from multiple APs for individual mobile wireless devices. Data for each mobile wireless device may be aggregated based upon a unique identifier for each mobile wireless device and subsequently analyzed by the location data analysis server 47 as described herein. Thus, in general, the memory 130 may comprise one or more tangible computer readable storage media (e.g., a memory device) encoded with software comprising computer executable instructions and when the software is executed (by the processor 120), it is operable to perform the operations described herein in connection with location data collection and aggregation logic 140.

Figure 3:
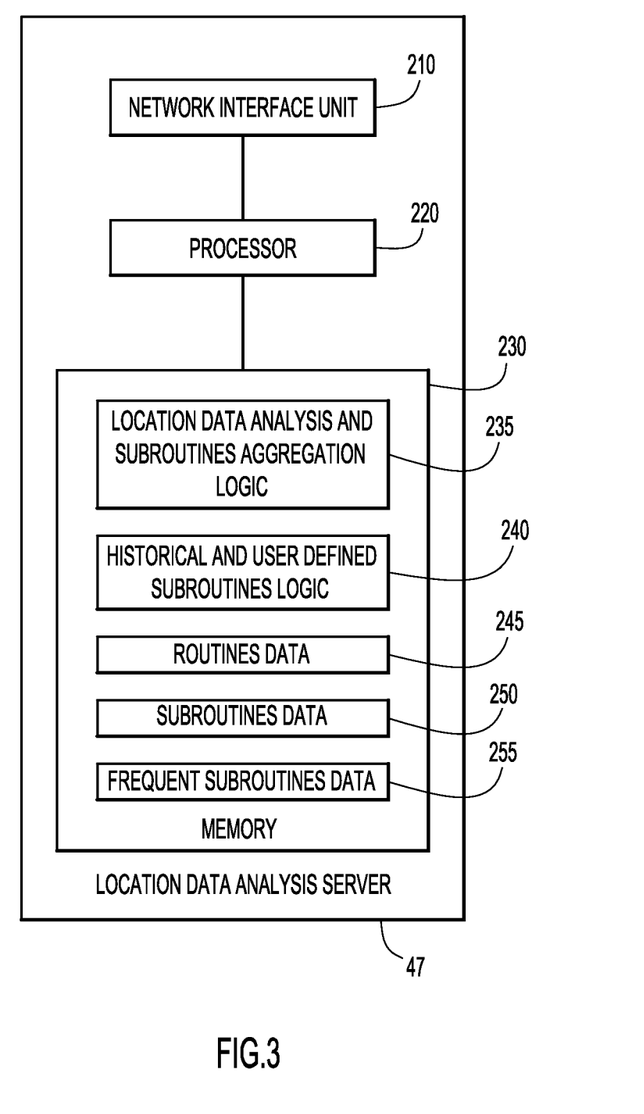
FIG. 3 is an example block diagram of a server configured to perform location data analysis and aggregation for a plurality of mobile wireless device users, according to an example embodiment.

A block diagram showing an example of the components of the location data analysis server 47 is now described with reference to FIG. 3. The location data analysis server 47 includes a network interface unit 210, a processor 220 and a memory 230. The network interface unit 210 is, for example, an Ethernet card, and enables network connectivity over network 30 to communicate with the WLAN controllers 40-1 to 40-K. The processor 220 is one or more microprocessors or microcontrollers. The memory 230 may be in the form of ROM, RAM, magnetic disk storage media devices, optical storage media devices, flash memory devices, electrical, optical, or other physical/tangible memory storage devices. The memory 230 stores instructions for location data analysis and subroutines aggregation logic 235, whose operations include analyzing individual mobile wireless device location data to determine crowd movement, as described further hereinafter.

The memory 230 also stores historical and user defined subroutines logic 240, which enables a user to define a subroutine and/or provides for analyzing a database comprising historical trajectories of mobile wireless devices to determine subroutines. Historical trajectories of mobile wireless devices may be stored in historical trajectories database 50. The memory 230 further stores aggregated individual mobile wireless device location data (each trajectory of an individual mobile device user is referred to as a routine) as routines data 245, segments of each routine (referred to as subroutines) for a plurality of routines as subroutines data 250, and aggregated subroutines (referred to as frequent subroutines) as frequent subroutines data 255, each of which is also described further hereinafter. In general, the memory 230 may comprise one or more tangible computer readable storage media (e.g., a memory device) encoded with software comprising computer executable instructions and when the software is executed (by the processor 220) it is operable to perform the operations described herein in connection with location data analysis and subroutine aggregation logic 235 and historical and user defined subroutines logic 240.

As previously indicated, a routine is a trajectory or a path of an individual mobile wireless device user. Location data from an individual mobile wireless device may be collected according to a data schema that defines one or more of a timestamp and location coordinates for every mobile wireless device. This approach may interface with platforms/ dashboards showing individual mobile devices within a geographical area. Since Wi-Fi is commonly and widely deployed, location data may be collected by existing (indoor) Wi-Fi infrastructure, although other positioning techniques which provide timestamp and location coordinates may be used.

A plurality of location data time points may be collected for each mobile wireless device, where x, y, and optionally z indicate a location and t indicates a time, for each $i^{th}$ mobile wireless device. Accordingly, each location data time point may be represented in a form of $(x_{1-i1}, y_{1-i1}, z_{1-i1}, t_{1-i1})$. All location data time points for each $i^{th}$ mobile device may be grouped together, e.g., the set of $(x_{1-i1}, y_{1-i1}, z_{1-i1}, t_{1-i1})$, $(x_{2-i1}, y_{2-i1}, z_{2-i1}, t_{2-i1}), \ldots (x_{N-i1}, y_{N-i1}, z_{N-i1}, t_{N-i1})$, to form a routine for an individual mobile wireless device. Similarly, the set of $(x_{1-i2}, y_{1-i2}, z_{1-i2}, t_{1-i2})$, $(x_{2-i2}, y_{2-i2}, z_{2-i2}, t_{2-i2}), \ldots (x_{N-i2}, y_{N-i2}, z_{N-i2}, t_{N-i2})$ may be grouped together to form another routine for another individual mobile wireless device. In this example, "i1" corresponds to a first mobile device and "i2" corresponds to a second mobile device. A routine comprises location data for particular mobile wireless devices that has been consolidated into a single record, table, list, etc., based on the mobile device identifier. For a plurality of mobile devices, each device has a corresponding unique signal identifier (e.g., such as a MAC address) that may be used to group location data. A series of location data time points for each mobile device may be generated by mobility services server 45.

A subroutine is a routine that has been divided into segments, with each segment representing a portion of the path or trajectory of an individual mobile wireless device user. In some aspects, subroutines are continuous, non-overlapping portions of a path. A plurality of subroutines may be generated for each of a plurality of routines.

A frequent subroutine represents an aggregation of subroutines (based on a parameter such as location) from a plurality of routines, with each routine corresponding to a particular mobile wireless device user. In some aspects, subroutines are associated with a direction, e.g., a direction of an individual mobile wireless device user, and a length of a segment, with the length of the segment being selected such that a direction may be established and the trajectory of an individual wireless mobile device user may be distinguished from other mobile device users. In some aspects, a threshold length value may be utilized to establish a length of a segment.

By statistically analyzing data from mobile wireless device users, subroutines that fall within a given confidence interval (e.g., as compared to user-defined subroutines or subroutines established from a historical trajectory database) may be grouped together, and defined as frequent subroutines. In some instances, frequent subroutines may be based upon a threshold frequency of subroutines falling within a specified confidence interval. For example, with a specified threshold frequency of 5, it may be determined that subroutines A1, B1, C1, D1, and E1 (each subroutine representing a different mobile device user within a same physical unit of space), fall within the specified confidence interval, and therefore, these subroutines are aggregated into a frequent subroutine with a frequency of '5'. In general, a confidence interval specifies a range with respect to a parameter (e.g., an average or mean value), with the range indicating a statistical likelihood that any given observation falls within the range specified by the confidence interval.

Figure 4:
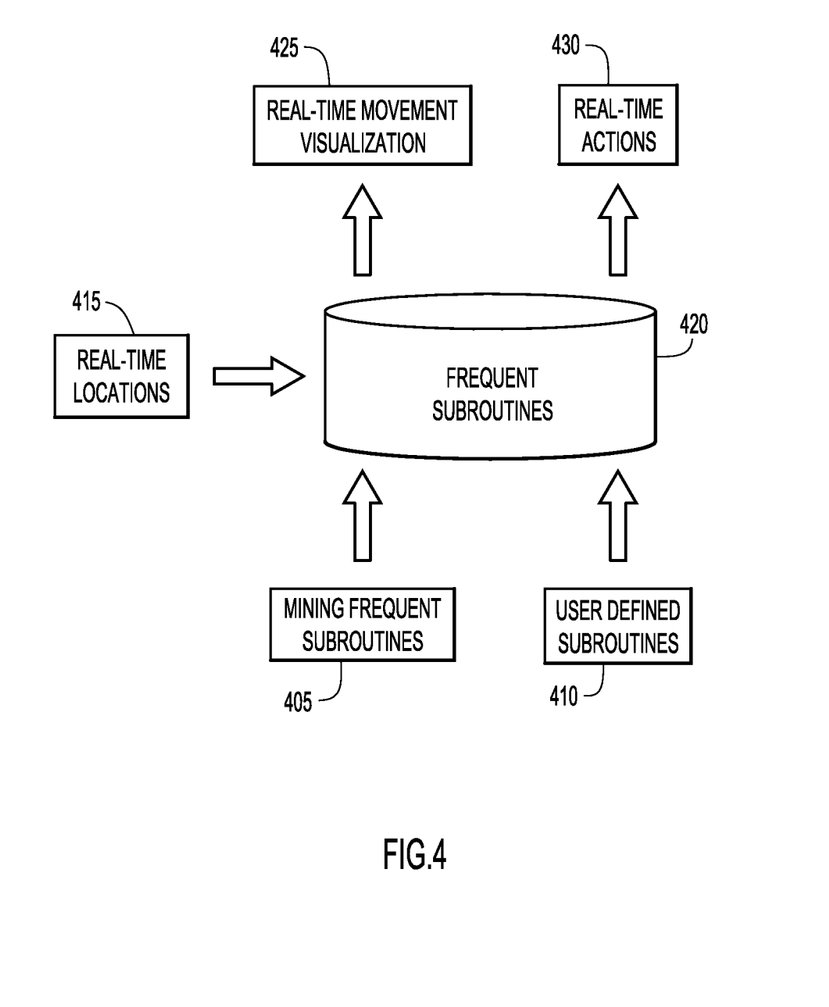
FIG. 4 is a diagram depicting functional relationships of the operations for obtaining location data, analyzing the location data to determine subroutines, and visualizing movement of crowds, according to an example embodiment.

FIG. 4 generally pictorially depicts the operations of the techniques described herein for utilizing location data of mobile wireless devices to determine movement of crowds.

The function of the location data analysis server 47 is now generally described with respect to operations of location data analysis and subroutine aggregation logic 235 and historical and user defined subroutines logic 240. Location data analysis server 47 may be a standalone server, or may be integrated with the mobility services server 45. The location data analysis server 47 receives routines for each mobile device generated by location data collection and aggregation logic 140.

At operation 405, historical trajectory database 50 may be mined to identify reference frequent subroutines. At operation 410, user-defined reference frequent subroutines may be entered into the system. For example, for a physical location, e.g., such as a shopping mall, a user may define each entry or exit point of the stores in the mall as a reference frequent subroutine, enabling entering and exiting traffic flows of crowds to be explicitly monitored.

At operation 415, the location data collection and aggregation logic 140 obtains location data from each mobile wireless device, the data comprising location readings from APs for each mobile wireless device. The mobility services server 45 aggregates received location data for each mobile device (e.g., based on an identifier, such as a MAC address) from a collection of APs, and provides corresponding routines to location data analysis and subroutine aggregation logic 235 for analysis.

Location data analysis and subroutine aggregation logic 235 may analyze received data from operation 415, and based upon reference frequent subroutines determined from operations 405 and 410, determine frequent subroutines at operation 420. Each routine may be divided into a series of subroutines, and the subroutines aggregated into frequent subroutines based on a parameter, such as a physical location. Frequent subroutines may be displayed on a graphical interface, e.g., overlaid on a physical floor plan or map, to visualize crowd movement in real-time or near real-time, as shown at operation 425. Alerts and/or actions may be triggered, as shown at operation 430, in response to abnormalities or anomalies in crowd movement, which may be detected based upon a predefined criteria, e.g., such as a rate of crowd movement exceeding a threshold speed. The visualization system receives location information for each mobile wireless device in real time, and the system continuously updates frequent subroutines and corresponding visual interfaces in real-time (or near real-time). Operations 405-430 are described below in additional detail with respect to FIGS. 5-9.

Figure 5:
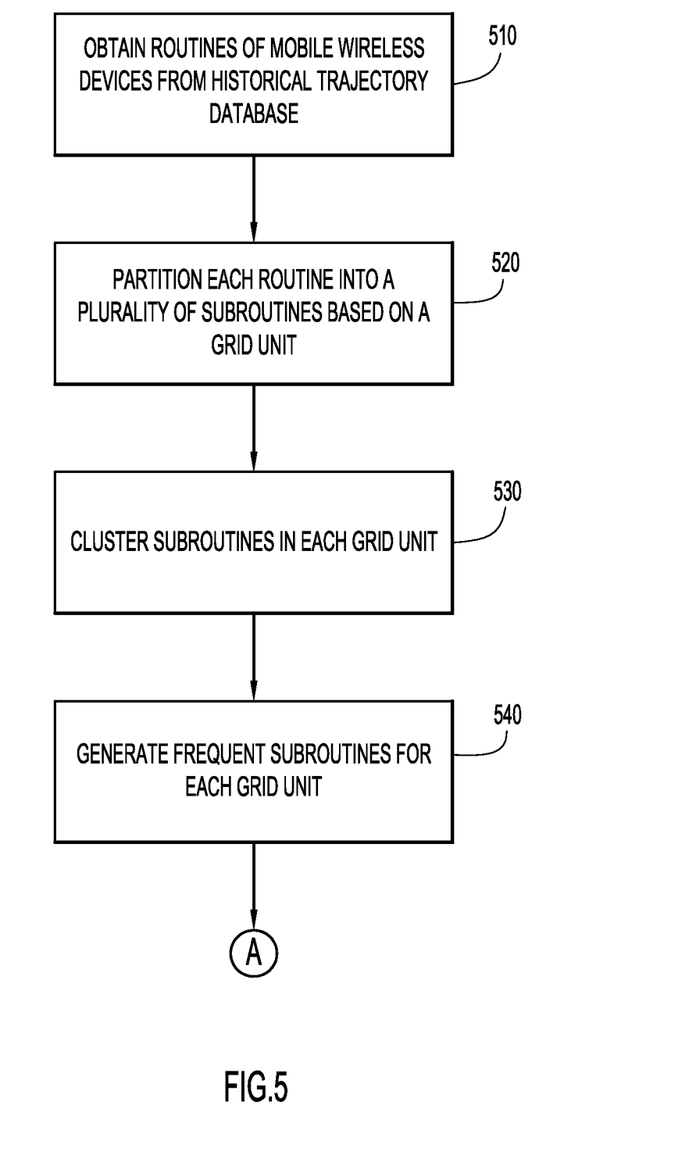
FIG. 5 is a flow chart depicting the operations of generating subroutines from historical trajectory data, according to an example embodiment.
Figure 6:
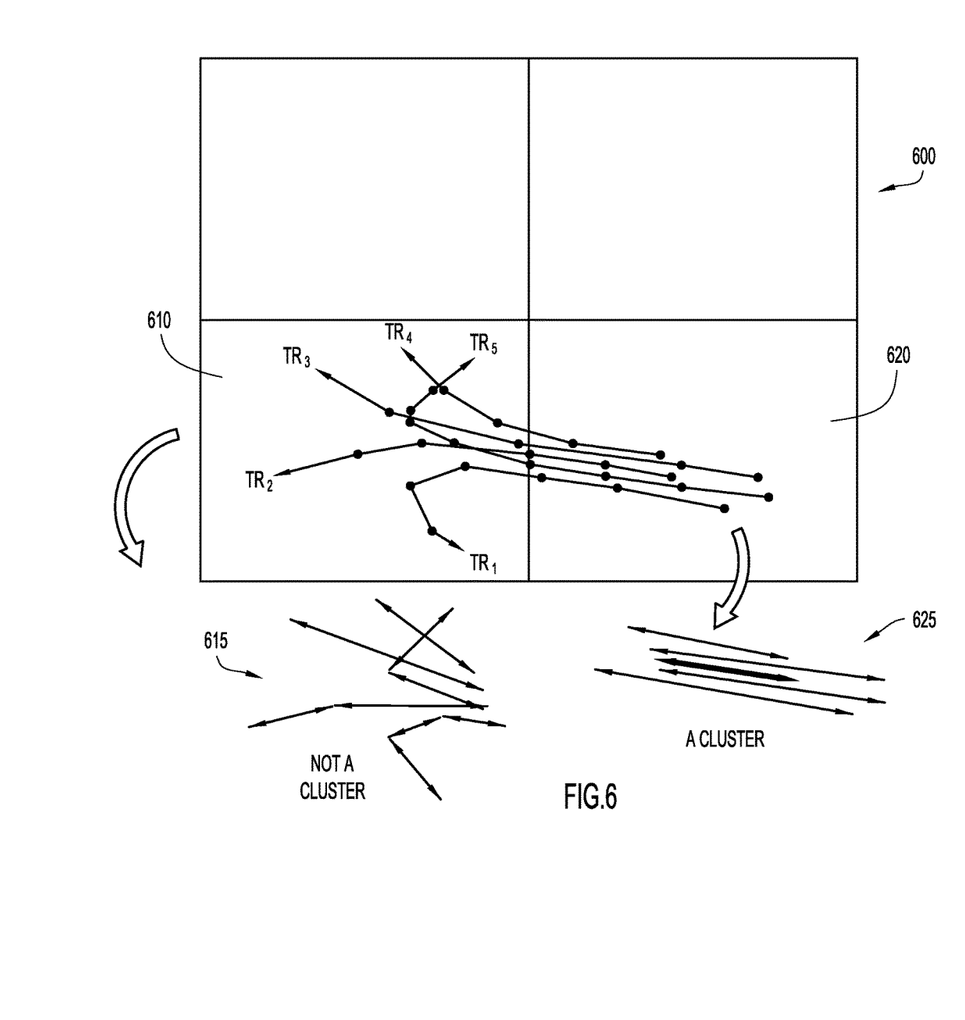
FIG. 6 is a graphical diagram showing an example of aggregating data to generate a subroutine, according to an example embodiment.
Figure 7:
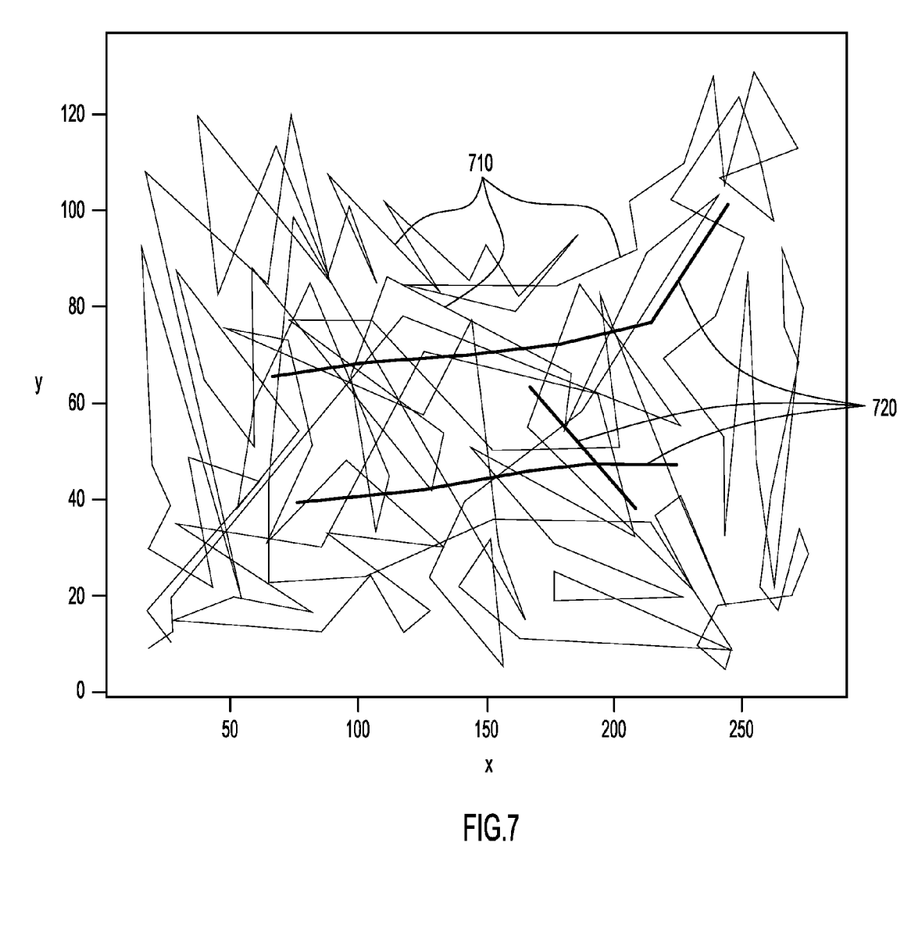
FIG. 7 is a graphical diagram showing an example of visualizing subroutines of a plurality of mobile device users, and visualizing corresponding frequent subroutines, according to an example embodiment.

Referring to FIG. 5, an example flow diagram for determining reference frequent subroutines from historical trajectory data is provided. As discussed previously in conjunction with operation 420 from FIG. 4, reference frequent subroutines may be mined from a historical location database or be user-defined. After reference frequent subroutines are determined, the system begins receiving real-time (or near real-time) location updates from mobile wireless devices and maintains frequent subroutines for these devices based on a specified parameter, e.g., within a given time interval or within a specified number of data points from a most recent data point. Reference is also made to FIGS. 6 and 7 for purposes of the description of FIG. 5.

At operation 510, routines of mobile wireless devices are obtained from a historical trajectory database. At operation 520, each routine may be partitioned based on a unit of distance, e.g., as defined by a grid unit (as shown in FIG. 6), with the size of the grid used to partition each routine into subroutines. At operation 530, the subroutines from operation 520 may be clustered, e.g., for a particular grid unit, as shown by FIG. 6. In some examples, a density-based clustering method, such as DBSCAN, may be used to cluster partitioned subroutines for each grid unit. A distance function may be used to measure a distance between two subroutines for a particular grid unit, and subroutines falling within a specified distance may be included within a cluster. Density based clustering methods and distance functions are well-known and will not be considered in detail herein. At operation 540, frequent subroutines are computed for each grid unit.

FIG. 6 shows an example of determining frequent subroutines based upon a grid unit. A grid 600 is provided, with corresponding routines shown in grid units 610 and 620. Five routines are shown, TR1-TR5, with each routine corresponding to a different mobile wireless device. Each routine is divided into a series of subroutines (as shown by the dotted line segments). In some cases, the grid size itself may be a variable parameter.

The subroutines in grid unit 610 are analyzed, and are determined not to represent a frequent subroutine, as the trajectories are unable to be clustered together based upon a specified distance parameter, as shown at reference numeral 615. Similarly, the subroutines in grid unit 620 are analyzed, and are represented as a frequent subroutine, as shown at reference numeral 625. In this case, the clustered subroutines fall within a specified distance, and occur at a higher frequency (than the threshold frequency), and therefore, may be represented as a frequent subroutine (as represented by the thick line). In some examples, a parameter, such as a median or mean of the clustered subroutines, can be computed and subsequently used to determine whether other new subroutines may be combined with the frequent subroutine.

Additionally, in some examples, multiple clusters of subroutines may be identified in each grid unit, and each cluster may be analyzed with regard to potential frequent subroutines. The frequency of each frequent subroutine can also be computed.

FIG. 7 shows a graphical representation of individual wireless mobile device users and corresponding frequent subroutines. The trajectories shown for the plurality of individual mobile wireless devices appear as a dense network of trajectories, in which aggregate crowd movement cannot be determined, as represented by reference numeral 710. In contrast, the bolded lines shown at reference numeral 720 represent trajectories of frequent subroutines determined for each grid unit.

Figure 8A:
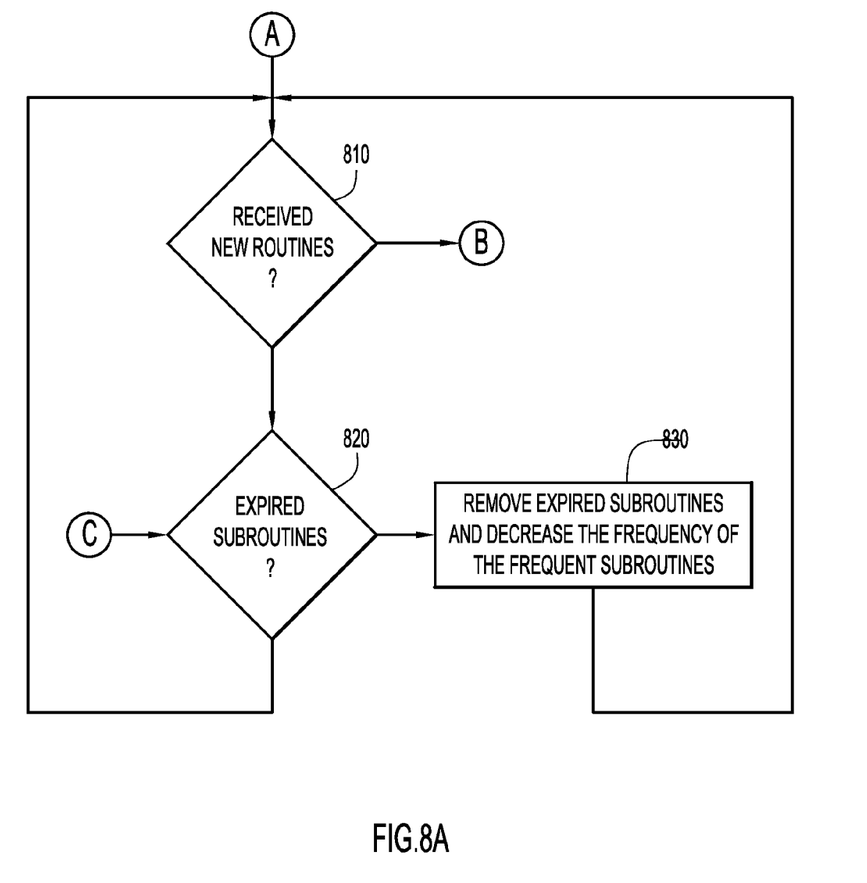
FIG. 8A is a flow chart generally depicting the operations of maintaining frequent subroutines, according to an example embodiment.
Figure 8B:
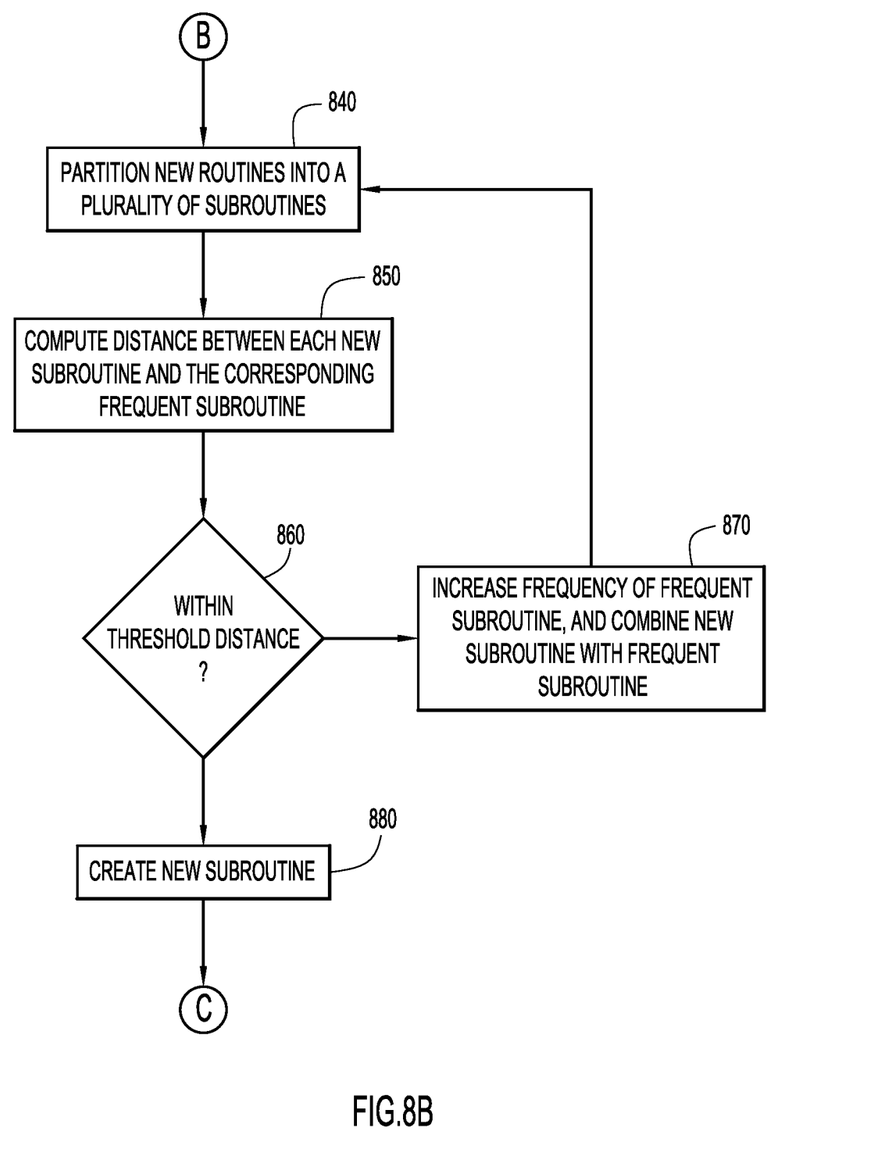
FIG. 8B is a flow chart generally depicting the operations of incorporating new subroutines into existing subroutines, according to an example embodiment.

FIG. 8A shows a flow chart of maintaining frequent subroutines, as part of operation 420 and based on location data analysis and subroutine aggregation logic 235. At operation 810, a determination is made as to whether new routines have been received (e.g., based on operation 415 in FIG. 4). If new routines have been received, the process continues as shown in FIG. 8B and described below. If new routines have not been received, the process continues to operation 820. At operation 820, a determination is made as to whether subroutines associated with the frequent subroutines have expired. If so, the expired subroutines are removed from the frequent subroutines, and the frequent subroutines are updated to reflect the deletion of this information at operation 830. If the subroutine has not expired, the process continues to operation 810. This flow allows frequent subroutines to be determined with respect to a 'sliding window', e.g., a row-based sliding window in which a predefined number of subroutines are maintained (e.g., the last 1000 updates) or a time-based sliding window in which updates within a specified time period (e.g., the last 5 minutes) are maintained.

FIG. 8B shows an example flow diagram for incorporating new subroutines into frequent subroutines. At operation 840, new routines from mobile wireless devices are partitioned into a plurality of subroutines. At operation 850, a distance is computed between each new subroutine and the corresponding frequent subroutine. If the new subroutine is within the specified threshold distance, as determined at operation 860, the frequency of the frequent subroutine may be increased, at operation 870, and the new subroutine is combined with the data of the frequent subroutine. If the new subroutine is not within a threshold distance of a frequent subroutine, a new subroutine may be created at operation 880. In some instances, operation 880 may be performed for a plurality of new subroutines (corresponding to a plurality of mobile wireless devices) that have been clustered according to a density-based clustering method, when the number of new subroutines falls within a specified distance of each other at a frequency exceeding a predefined threshold frequency.

The operations described above in connection with FIGS. 8A and 8B may occur on an ongoing basis or at a specified periodic interval of time. As new routines are received, clustering may be performed and corresponding feature statistics may be determined, to characterize spatial and temporal aspects of the routines.

Figure 9:
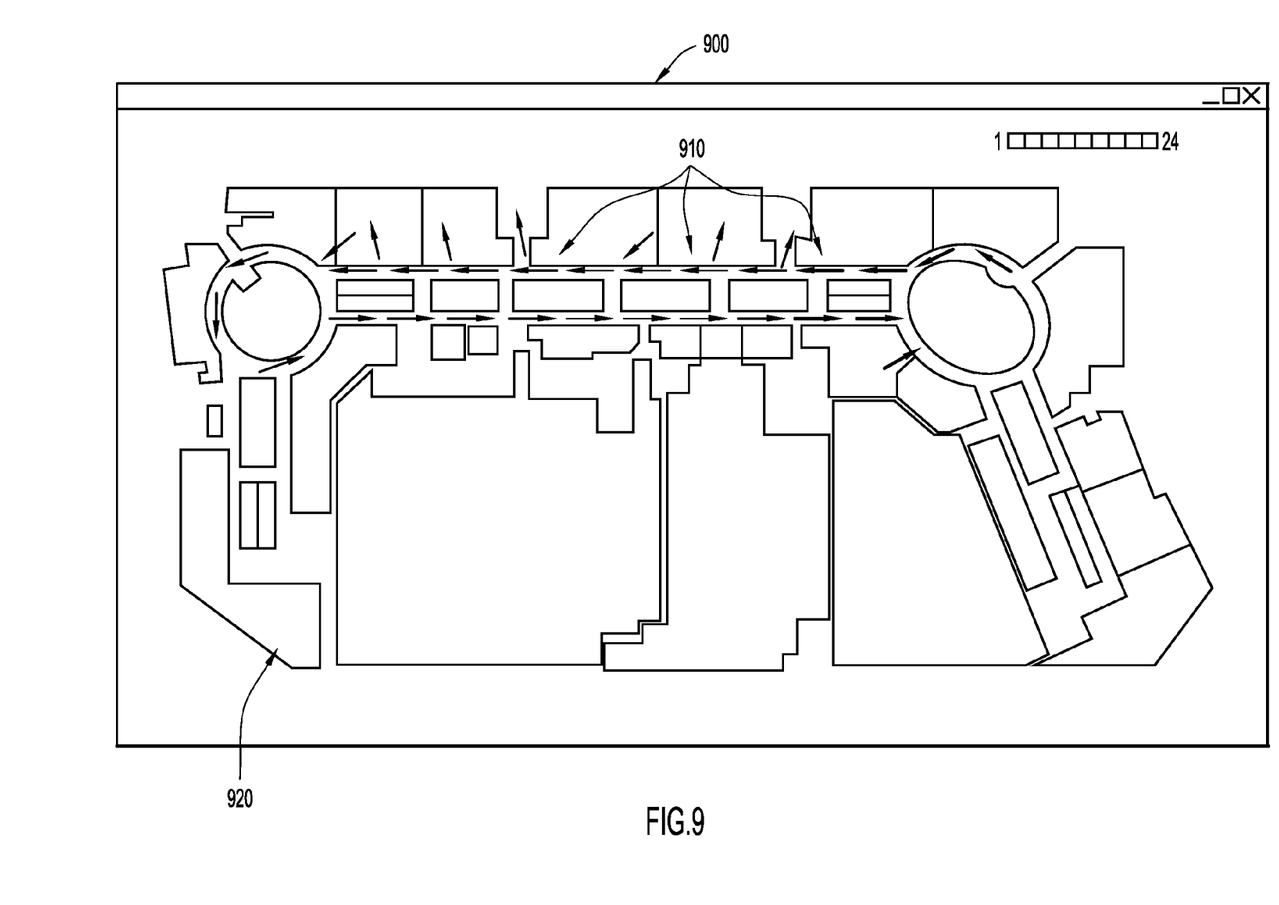
FIG. 9 is a flow chart generally depicting visualizing frequent subroutines, according to an example embodiment.

Reference is now made to FIG. 9. FIG. 9 illustrates a graphical illustration 900 of frequent subroutines 910 overlaid onto a physical blueprint of a building 920, allowing crowd flow to be visualized with respect to particular floors, business locations, etc. In this example, frequent subroutines 920 are represented by arrows, with frequent subroutines having a higher number of subroutines represented with a thicker line, and frequent subroutines having a lower number of subroutines represented with a thinner line. In other embodiments, the density of subroutines (reflecting crowded paths) may be represented by a heat map color palette, gray scale palette, or a thick arrow/thin arrow representation.

In other embodiments, an average velocity of a crowd (represented by a frequent subroutine) may be visualized by controlling an animation speed corresponding to movement of a crowd.

Based on real-time or near real-time visualization and maintenance of frequent subroutines, notifications may be sent to users based upon pre-defined rules. Such rules may be geared to detect security, medical or other emerging situations. Alerts may be triggered in an automated manner, e.g., by setting up automated notifications or alerts to be sent by the system upon a change of a monitored parameter. For example, if a density of a particular frequent subroutine exceeds a predetermined crowd density threshold, or if a speed of movement of a crowd exceeds a speed threshold, an alert or notification may be triggered. In other cases, a user may monitor the graphical display, and manually trigger alerts or notifications.

Figure 10:
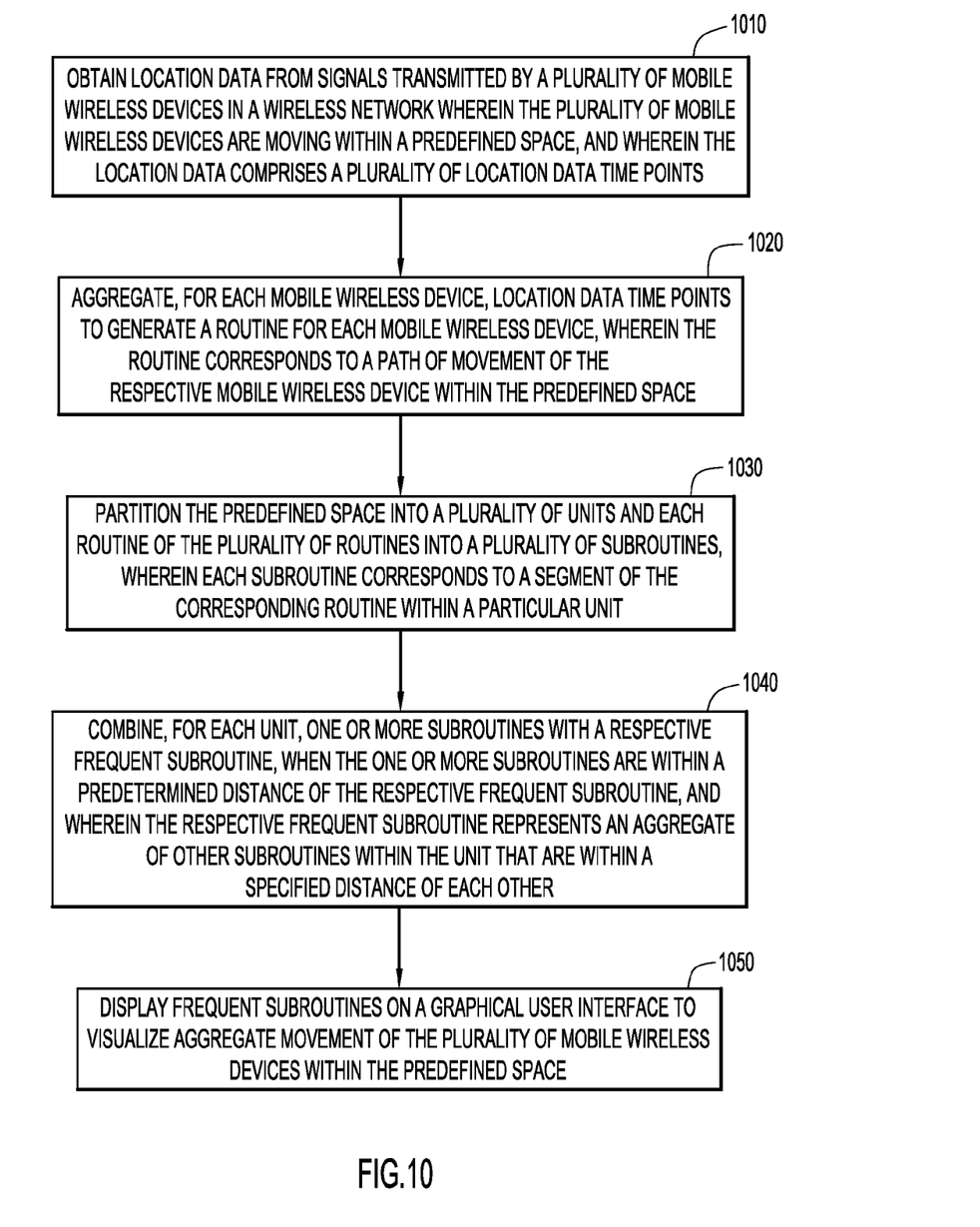
FIG. 10 is a flow chart generally depicting the operations of analyzing location data and aggregating the analyzed data to generate frequent subroutines.

FIG. 10 is a flow chart generally depicting the operations of obtaining and analyzing location data to determine crowd movement according to an example embodiment. At operation 1010, location data from signals transmitted by a plurality of mobile wireless devices in a wireless network is obtained, wherein the plurality of mobile wireless devices are moving within a predefined space, and wherein the location data comprises a plurality of location data time points. At operation 1020, for each mobile wireless device, location data time points are aggregated to generate a plurality of routines, wherein each routine corresponds to a path of movement of the respective mobile wireless device within the predefined space. At operation 1030, the predefined space is partitioned into a plurality of units and each routine of the plurality of routines into a plurality of subroutines, wherein each subroutine corresponds to a segment of the corresponding routine within a particular unit. At operation 1040, for each unit, one or more subroutines are combined with a respective frequent subroutine, when the one or more subroutines are within a predetermined distance of the respective frequent subroutine, and wherein the respective frequent subroutine represents an aggregate of other subroutines within the unit that are within a specified distance of each other. Frequent subroutines on a graphical user interface are displayed to visualize aggregate movement of the plurality of mobile wireless devices within the predefined space.

The techniques presented herein enable visualization of crowd movements and frequent subroutines (also known as hot routines) based upon received location data from mobile wireless devices. By efficiently generating frequent subroutines in real-time or near real-time, an up-to-date density and velocity map of crowd movement may be established and maintained, providing a high-level of visualization of crowd dynamics. Alerts and/or actions may be triggered immediately upon detection of an anomaly e.g., anomalies in crowd density or speed. These techniques automatically provide for analyzing and visualizing the movement of crowds, without having a defined starting point for each individual.

These techniques enable visualizing the movement of crowds (instead of individuals) for indicating movement of crowds in a certain area. These visualization techniques allow for user interaction and are easy to read. Emerging situations may easily be detected and notifications provided in real-time or near real-time. Additionally, hot routines (crowded paths as represented by frequent subroutines) may be easily identified by these visualization techniques. Frequent subroutines (hot routines) help to visualize crowd movement. Based on the analysis of frequent subroutines, frequent subroutines may be used to quantify crowd flow for a given area.

In summary, in one form, a method is provided comprising: obtaining location data from signals transmitted by a plurality of mobile wireless devices in a wireless network wherein the plurality of mobile wireless devices are moving within a predefined space, and wherein the location data comprises a plurality of location data time points; aggregating, for each mobile wireless device, location data time points to generate a plurality of routines, wherein each routine corresponds to a path of movement of the respective mobile wireless device within the predefined space; partitioning the predefined space into a plurality of units and each routine of the plurality of routines into a plurality of subroutines, wherein each subroutine corresponds to a segment of the corresponding routine within a particular unit; combining, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and displaying frequent subroutines on a graphical user interface to visualize aggregate movement of the plurality of mobile wireless devices within the predefined space.

In another form, an apparatus is provided comprising: a network interface unit configured to enable network communications, a memory, and a processor configured to: obtain location data from signals transmitted by a plurality of mobile wireless devices in a wireless network wherein the plurality of mobile wireless devices are moving within a predefined space, and wherein the location data comprises a plurality of location data time points; aggregate, for each mobile wireless device, location data time points to generate a plurality of routines, wherein each routine corresponds to a path of movement of the respective mobile wireless device within the predefined space; partition the predefined space into a plurality of units and each routine of the plurality of routines into a plurality of subroutines, wherein each subroutine corresponds to a segment of the corresponding routine within a particular unit; combine, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and display frequent subroutines on a graphical user interface to visualize aggregate movement of the plurality of mobile wireless devices within the predefined space.

In yet another form, a non-transitory computer readable storage media is provided that obtains location data, via a network interface, from signals transmitted by a plurality of mobile wireless devices in a wireless network wherein the plurality of mobile wireless devices are moving within a predefined space, and wherein the location data comprises a plurality of location data time points; aggregates, for each mobile wireless device, location data time points to generate a plurality of routines, wherein each routine corresponds to a path of movement of the respective mobile wireless device within the predefined space; partitions the predefined space into a plurality of units and each routine of the plurality of routines into a plurality of subroutines, wherein each subroutine corresponds to a segment of the corresponding routine within a particular unit; combines, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and displays frequent subroutines on a graphical user interface to visualize aggregate movement of the plurality of mobile wireless devices within the predefined space.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:
1. A computer-implemented method comprising:
   obtaining location data from signals transmitted by a plurality of mobile wireless devices in a wireless network wherein the plurality of mobile wireless devices are moving within a predefined space, and wherein the location data comprises a plurality of location data time points;

aggregating, for each mobile wireless device, the plurality of location data time points to form sets of the location data time points for each mobile wireless device;

generating a plurality of routines from the sets of location data time points, wherein each routine is a path of movement of the respective mobile wireless device within the predefined space;

partitioning the predefined space into a plurality of units and each routine of the plurality of routines into a plurality of subroutines, wherein each subroutine is a path segment of the corresponding path of movement within a particular unit;

combining, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and displaying frequent subroutines on a graphical user interface to visualize aggregate movement of the plurality of mobile wireless devices within the predefined space.

2. The method of claim 1, further comprising:
obtaining a first plurality of routines from a first plurality of mobile wireless devices from a database comprising historical trajectories of the first plurality of mobile wireless devices;
partitioning each routine of the first plurality of routines into a first plurality of subroutines;
clustering the first plurality of subroutines based on a distance function to form one or more clusters for each of the plurality of units; and
aggregating the clustered subroutines to form first frequent subroutines, when a number of subroutines of the first plurality of subroutines within a given cluster is above a threshold frequency value.

3. The method of claim 1, further comprising:
creating a new frequent subroutine for a group of subroutines that are outside of a predetermined distance from any frequent subroutine, when the number of subroutines in the group exceeds a threshold frequency value and are within a specified distance of each other.

4. The method of claim 1, further comprising:
determining whether a given subroutine has expired;
removing the expired subroutine from the frequent subroutine; and
updating a frequency associated with the frequent subroutine to reflect the removal of the expired subroutine.

5. The method of claim 1, wherein combining further comprises combining one or more subroutines with a first frequent subroutine, when the one or more subroutines are within a predetermined distance of the first frequent subroutine, and updating a frequency characteristic associated with the first frequent subroutine to reflect the inclusion of the one or more subroutines into the first frequent subroutine.

6. The method of claim 1, wherein displaying further comprises displaying aggregate movement of the plurality of mobile wireless devices within the predefined space to detect an anomaly, and further comprising providing a notification in response to the detected anomaly.

7. The method of claim 1, wherein each of the location data time points comprises a timestamp, a unique mobile wireless device identifier, and location information indicating where in the predefined space an associated mobile wireless device is located.

8. The method of claim 1, wherein displaying further comprising:
displaying a density of mobile wireless devices associated with each frequent subroutine in real-time.

9. An apparatus comprising:
a network interface unit configured enable network communications;
a memory; and
a processor coupled to the network interface unit and configured to:
obtain location data from signals transmitted by a plurality of mobile wireless devices in a wireless network wherein the plurality of mobile wireless devices are moving within a predefined space, and wherein the location data comprises a plurality of location data time points;
aggregate, for each mobile wireless device, the plurality of location data time points to form sets of the location data time points for each mobile wireless device;
generate a plurality of routines from the sets of location data time points, wherein each routine is a path of movement of the respective mobile wireless device within the predefined space;
partition the predefined space into a plurality of units and each routine of the plurality of routines into a plurality of subroutines, wherein each subroutine is a path segment of the corresponding path of movement within a particular unit;
combine, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and
display frequent subroutines on a graphical user interface to visualize aggregate movement of the plurality of mobile wireless devices within the predefined space.

10. The apparatus of claim 9, wherein the processor is further configured to:
obtain a first plurality of routines from a first plurality of mobile wireless devices from a database comprising historical trajectories of the first plurality of mobile wireless devices;
partition each routine of the first plurality of subroutines into a first plurality of subroutines;
cluster the first plurality of subroutines based on a distance function to form one or more clusters for each of the plurality of units; and
aggregate the clustered subroutines to form first frequent subroutines, when a number of subroutines of the first plurality of subroutines within a given cluster is above a threshold frequency value.

11. The apparatus of claim 9, wherein the processor is further configured to:
create a new frequent subroutine for a group of subroutines that are outside of a predetermined distance from any frequent subroutine, when the number of subroutines in the group exceeds a threshold frequency value and are within a specified distance of each other.

12. The apparatus of claim 9, wherein the processor is further configured to:
determine whether a given subroutine has expired;
remove the expired subroutine from the frequent subroutine; and update a frequency associated with the frequent subroutine to reflect the removal of the expired subroutine.

13. The apparatus of claim 9, wherein the processor is further configured to:
combine one or more subroutines with a first frequent subroutine, when the one or more subroutines are within a predetermined distance of the first frequent subroutine, and updating a frequency characteristic associated with the first frequent subroutine to reflect the inclusion of the one or more subroutines into the first frequent subroutine.

14. The apparatus of claim 9, wherein the processor is further configured to:
display aggregate movement of the plurality of mobile wireless devices within the predefined space to detect an anomaly, and further comprising providing a notification in response to the detected anomaly.

15. The apparatus of claim 14, wherein the processor is further configured to:
display a density of mobile wireless devices associated with each frequent subroutine in real-time.

16. A non-transitory computer readable storage media encoded with instructions that, when executed by a processor of a computing device, cause the processor to:
obtain location data, via a network interface, from signals transmitted by a plurality of mobile wireless devices in a wireless network wherein the plurality of mobile wireless devices are moving within a predefined space, and wherein the location data comprises a plurality of location data time points;
aggregate, for each mobile wireless device, the plurality of location data time points to form sets of the location data time points for each mobile wireless device;
generate a plurality of routines from the sets of location data time points, wherein each routine is a path of movement of the respective mobile wireless device within the predefined space;
partition the predefined space into a plurality of units and each routine of the plurality of routines into a plurality of subroutines, wherein each subroutine is a path segment of the corresponding path of movement within a particular unit;
combine, for each unit, one or more subroutines with a respective frequent subroutine, when the one or more subroutines are within a predetermined distance of the respective frequent subroutine, and wherein the respective frequent subroutine represents an aggregate of other subroutines within the unit that are within a specified distance of each other; and
display frequent subroutines on a graphical user interface to visualize aggregate movement of the plurality of mobile wireless devices within the predefined space.

17. The non-transitory computer readable storage media of claim 16, wherein the processor is configured to:
obtain a first plurality of routines from a first plurality of mobile wireless devices from a database comprising historical trajectories of the first plurality of mobile wireless devices;
partition each routine of the first plurality of routines into a first plurality of subroutines;
cluster the first plurality of subroutines based on a distance function to form one or more clusters for each of the plurality of units; and
aggregate the clustered subroutines to form first frequent subroutines, when a number of subroutines of the first plurality of subroutines within a given cluster is above a threshold frequency value.

18. The non-transitory computer readable storage media of claim 16, wherein the processor is configured to:
create a new frequent subroutine for a group of subroutines that are outside of a predetermined distance from any frequent subroutine, when the number of subroutines in the group exceeds a threshold frequency value and are within a specified distance of each other.

19. The non-transitory computer readable storage media of claim 16, wherein the processor is configured to:
determine whether a given subroutine has expired;
remove the expired subroutine from the frequent subroutine; and
update a frequency associated with the frequent subroutine to reflect the removal of the expired subroutine.

20. The non-transitory computer readable storage media of claim 16 wherein the processor is configured to:
combine one or more subroutines with a first frequent subroutine, when the one or more subroutines are within a predetermined distance of the first frequent subroutine, and updating a frequency characteristic associated with the first frequent subroutine to reflect the inclusion of the one or more subroutines into the first frequent subroutine.

* * * * *